(12) United States Patent
Kubota et al.

(10) Patent No.: US 7,769,483 B2
(45) Date of Patent: Aug. 3, 2010

(54) DETECTION-SIGNAL TRANSMITTING APPARATUS

(75) Inventors: Osamu Kubota, Higashi-matsuyama (JP); Takayuki Yui, Higashi-matsuyama (JP); Hideo Hurukawa, Higashi-matsuyama (JP); Haruhiko Ueno, Higashi-matsuyama (JP)

(73) Assignee: Bosch Corporation, Tokyo (JP)

( * ) Notice: Subject to any disclaimer, the term of this patent is extended or adjusted under 35 U.S.C. 154(b) by 285 days.

(21) Appl. No.: 11/504,708

(22) Filed: Aug. 16, 2006

(65) Prior Publication Data
US 2007/0005177 A1  Jan. 4, 2007

Related U.S. Application Data

(63) Continuation of application No. PCT/JP2005/002215, filed on Feb. 15, 2005.

(30) Foreign Application Priority Data
Feb. 17, 2004  (JP) ............................. 2004-040438

(51) Int. Cl.
*G06F 19/00* (2006.01)
*B23Q 17/09* (2006.01)
(52) U.S. Cl. .......................... 700/164; 700/175; 451/5; 340/679
(58) Field of Classification Search ................. 700/175, 700/164; 451/5, 21; 340/679, 680
See application file for complete search history.

(56) References Cited

U.S. PATENT DOCUMENTS 5,125,188 A * 6/1992 Ogawa et al. ................... 451/5

6,508,614 B1   1/2003 Ozaki et al.
2003/0030565 A1 * 2/2003 Sakatani et al. ............. 340/679

FOREIGN PATENT DOCUMENTS

| EP | 0 446 849 A2 | 9/1991 |
|---|---|---|
| JP | 54-39276 | 3/1979 |
| JP | 58-40246 | 3/1983 |
| JP | 4-240049 | 8/1992 |
| JP | 2000-61781 | 2/2000 |
| JP | 2000-263377 | 9/2000 |
| JP | 2001-116867 | 4/2001 |
| JP | 2002-59342 | 2/2002 |
| WO | 00/73018 | 12/2000 |

* cited by examiner

*Primary Examiner*—Albert DeCady
*Assistant Examiner*—Steven R Garland
(74) *Attorney, Agent, or Firm*—Wenderoth, Lind & Ponack, L.L.P.

(57) ABSTRACT

A detection signal representing changes of an object observed can be easily transmitted to any desirable site, without performing complex adjustment to use the signal. An AE sensor is provided on an appropriate part of the circumferential surface of a rotating-side chuck which holds a workpiece. A signal-transmitting unit is provided in a space made in the rotating-side chuck. A signal-receiving unit is mounted on an appropriate part of a main section on which the rotating-side chuck is provided. The signal-transmitting unit transmits by radio a detection signal generated by the AE sensor. The signal-receiving unit receives and demodulates the detection signal, generating a signal that will be processed in signal processing.

4 Claims, 6 Drawing Sheets

DETECTION-SIGNAL TRANSMITTING APPARATUS

This is a continuation of International Application No. PCT/JP2005/002215, filed Feb. 15, 2005.

BACKGROUND OF THE INVENTION

1. Field of the Invention

The present invention relates to a detection-signal transmitting apparatus that detects changes of an object observed and transmits detected signals representing the changes. More particularly, the invention relates to an apparatus designed to transmit detection signals easily to a site that is remote from the object.

2. Description of the Related Art

In some cases, it is required that changes in various objects observed be detected in order to control various electronic devices and that the signals representing the changes be transmitted to a desired site. More specifically, in a grinding machine and the like, for example, the condition in which a grindstone contacts a work piece should be detected in order to control the position of the grindstone. As well known, when the grindstone contacts the workpiece, ultrasonic waves are generated. If the ultrasonic waves generated at the moment the grindstone contacts the workpiece are detected, the condition in which the grindstone contacts the workpiece can be recognized from the level of the signal of the ultrasonic waves. Hence, various apparatuses for detecting ultrasonic waves and transmitting the signal have been proposed.

For example, Patent Document 1 (noted below) discloses a grinding machine, which is hence known to the public. This machine uses a piezoelectric element, which is attached to a grindstone to detect ultrasonic waves that are generated when the grindstone contacts a workpiece. A first coil is connected in series to the piezoelectric element. A second coil is arranged on the central axis of the first coil and thus opposed thereto. The electromagnetic coupling of the first and second coils can induce, at the second coil, the ultrasonic-wave signal detected by the piezoelectric element.

In the conventional grinding machine described above, however, the first and second coils must be precisely adjusted in position to be arranged on the same axis so that the magnetic coupling between them may be effective. Further, sites where the machine can be installed are limited because of its configuration. That is, the machine has small freedom of use. Moreover, the first and second coils need to have so many turns and so large a size that any signal the second coil generates is at a level high enough to be processed well. Therefore, the conventional grinding machine can hardly be as small as is generally demanded.

Patent Document 1: European Pat. Appln. Publication No. 446849

SUMMARY OF THE INVENTION

The present invention has been made in view of the foregoing. An object of this invention is to provide a detection-signal transmitting apparatus, a detection-signal transmitting apparatus for machine tools, an AE-signal transmitting apparatus for dressing apparatus, and a dressing apparatus, each of which can easily transmit to any desired site a detection signal representing changes of an object observed, has large freedom of installation and requires only minimum adjustment before use.

Another object of this invention is to provide a detection-signal transmitting apparatus, a detection-signal transmitting apparatus for machine tools, an AE-signal transmitting apparatus for dressing apparatus, and a dressing apparatus, each of which can meet the demand for miniaturization and can generate stable detection signals of a sufficiently high level.

According to a first embodiment of this invention, a detection-signal transmitting apparatus is provided. The apparatus comprises: a detecting means for detecting changes in condition of an object; and a transmitting/receiving means for transmitting and receiving, by radio, a signal output from the detecting means.

According to a second embodiment of this invention, a detection-signal transmitting apparatus for use on a machine tool. This apparatus is designed to detect a change in condition of an object being machined by a machine tool and to transmit a signal for controlling the machine tool. The apparatus comprises: a detecting/radio-transmitting means for detecting changes in condition of an object, converting a detection signal to a digital signal and transmitting the digital signal by radio; a radio power-supplying means for supplying external power, by radio, to the detecting/radio-transmitting means; and a receiving means for receiving and demodulating the signal transmitted from the detecting/radio-transmitting means.

According to a third embodiment of this invention, an AE-signal transmitting apparatus for use on a dressing apparatus is provided. The transmitting apparatus comprises: a detecting/radio-transmitting means for detecting ultrasonic waves generated when a grindstone contacts a dresser, converting a detection signal to a digital signal and transmitting the digital signal by radio; a radio power-supplying means for supplying external power, by radio, to the detecting/radio-transmitting means; and a receiving means for receiving and demodulating the signal transmitted from the detecting/radio-transmitting means.

According to a fourth embodiment of this invention, a dressing apparatus for performing dressing on a grindstone is provided. The dressing apparatus comprises: an ultrasonic-wave detector that detects ultrasonic waves generated when a grindstone contacts a dresser; a digital converter that converts an output signal of the ultrasonic-wave detector to a digital signal; a radio transmitter that transmits, by radio, an output signal of the digital converter; a radio power-supply unit that supplies external power, by radio, to the digital converter and the radio transmitter; a receiver that receives and demodulates a signal transmitted from the radio transmitter; and a signal processor that processes and converts a detection signal generated by ultrasonic-wave detector and demodulated by the receiver, to a predetermined signal for controlling the dressing.

DETAILED DESCRIPTION OF THE INVENTION

Embodiments of the present invention will be described, with reference to FIG. 1 to FIG. 6.

It is to be understood that the members, arrangement, and so on explained below are not to limit the present invention, and various changes and modifications can be made within the sprit and scope of the present invention.

Figure 1:
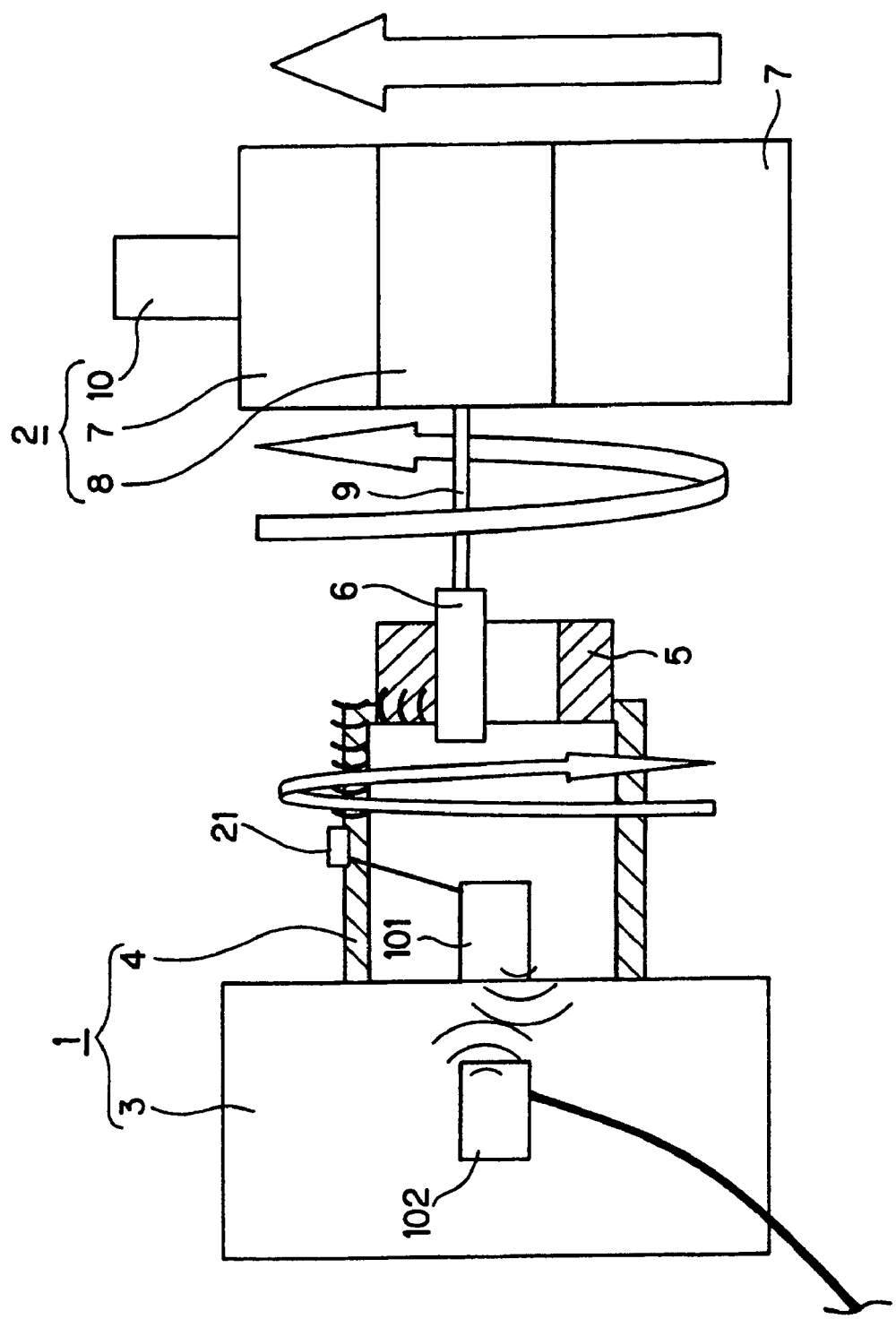
FIG. 1 is a diagram showing the first configuration of a detection-signal transmitting apparatus according to an embodiment of this invention.

First, the first configuration of a detection-signal transmitting apparatus according to an embodiment of this invention will be described, with reference to FIG. 1 and FIG. 2.

The first configuration is a detection-signal transmitting apparatus for use on grinding machines. This configuration is fit for, particularly, detection of a contact between a grindstone 6 and a workpiece 5.

The configuration of the apparatus will be described in detail. The grinding machine is of a configuration that is well known to the public. It has a workpiece-holding unit 1 and a grindstone-holding unit 2. The unit 1 holds a workpiece 5 as will be explained later. The unit 2 holds a grindstone 6 and moves the same to and from the workpiece 5.

The workpiece-holding unit 1 comprises a main section 3 and a rotating-side chuck 4. The main section 3 is fixed to a base that is secured on an installation floor (not shown). The rotating-side chuck 4 can be driven by a motor (not shown) that is incorporated in the main section 3.

At least that part of the rotating-side chuck 4, which protrudes from the main section 3, is shaped like a hollow cylinder. The workpiece 5 is removably attached to the distal end of that part of the rotating-side chuck 4.

On the other hand, the grindstone-holding unit 2 has a sliding base 7, to which the grindstone 6 is attached as will be described below.

That is, a grindstone spindle unit 8 to which the grindstone 6 is attached is provided on the sliding base 7 and can be rotated by a motor (not shown). The grindstone 6 is removably secured to one end of a grindstone shaft 9. The other end of the grindstone shaft 9 is inserted in the grindstone spindle unit 8.

The sliding base 7 can move on a field table 14 (see FIG. 3), approaching the workpiece 5, as a feed-in motor 10 is driven. The field table 14 is moved as a motor (not shown) is driven by means of NC control. Further, the sliding base 7 can rotate on the field table 14, and the grindstone spindle unit 8 can rotate on the sliding table 7 (see FIG. 6).

In the grinding machine thus configured, as a detection means, an AE sensor (ultrasonic-wave sensor) 21 is provided at an appropriate position on the circumferential surface of the rotating-side chuck 4. A signal-transmitting unit 101 is provided in the rotating-side chuck 4.

Further, a signal-receiving unit 102 is provided at an appropriate position on the workpiece-holding unit 1, for example, at an appropriate position on the main section 3.

Figure 2:
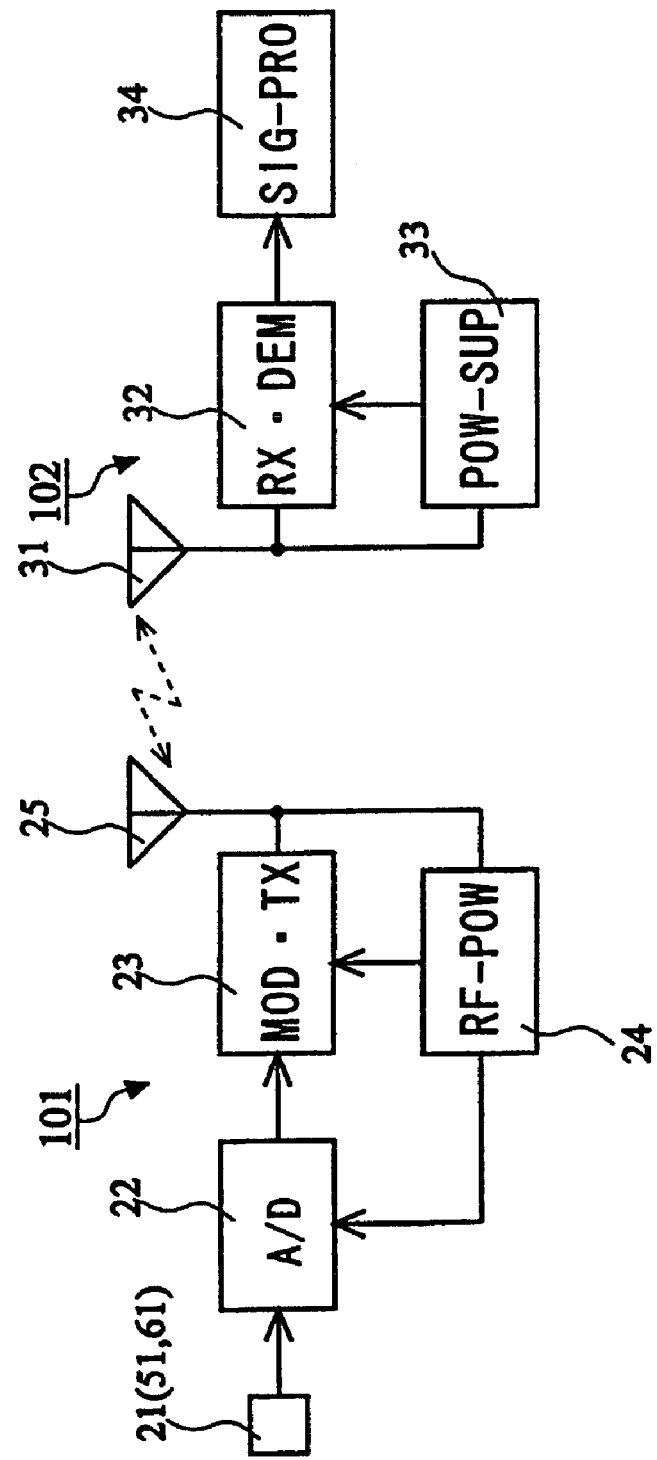
FIG. 2 is a diagram depicting the configurations of a signal-transmitting unit and a signal-receiving unit, both used in the detection-signal transmitting apparatus according to the embodiment of the invention.

To be more specific, the signal-transmitting unit 101 has, as shown in FIG. 2, an analog-to-digital converter 22 ("A/D" in FIG. 2), a modulating/transmitting unit 23 ("MOD TX" in FIG. 2), a radio power-supply unit 24 ("RF-POWER" in FIG. 2), and a transmitting antenna 25. The modulating/transmitting unit 23 functions as a radio transmitter.

The analog-to-digital converter 22 is connected to the AE sensor 21 and used to convert the analog signal output from the AE sensor 21, to a digital signal.

The modulating/transmitting unit 23 modulates the output signal of the AE sensor 21 converted to a digital signal by the analog-to-digital converter 22 so that the output signal may be transmitted by radio. The modulation mode and the radio-transmission mode may be of the types widely used and well known. They need not be limited to particular ones. They can be selected from the various modes available. The radio-transmission frequency used should better be so-called microwave band, because it is desired that the transmitting antenna 25 be as small as possible.

The transmitting antenna 25 need not be limited to a particular type, either. It can be of any type that is widely used and well known so long as it suitable for the frequency for the modulating/transmitting unit 23.

The radio power-supply unit 24 supplies power that is required in the analog-to-digital converter 22 and the modulating/transmitting unit 23. The unit 24 is designed to receive radio waves from the signal-receiving unit 102 (later described) via the transmitting antenna 25, converts the radio waves to power, generates a necessary power-supply voltage from the power and applies the power-supply voltage.

Preferably, the analog-to-digital converter 22, the modulating/transmitting unit 23 and the radio power-supply unit 24 should be provided in the form of an IC chip. If they are so provided, they will occupy but a very small space in the grinding machine.

On the other hand, the signal-receiving unit 102 has a receiving antenna 31, a receiving/demodulating unit 32 ("RX·DEM" in FIG. 2) and a power-supply unit 33 ("POW-SUP" in FIG. 2). The unit 32 is used as receiver. A signal-processing unit 34 ("SIG-PRO" in FIG. 2) is provided. This unit 34, which is used as signal processor, processes the signal output from the AE sensor 21 and reproduced in the signal-receiving unit 102, and generates signals that can control the grinding machine. The signal-processing unit 34 may be incorporated in the signal-receiving section 102 or provided outside the signal-receiving section 102. Alternatively, the signal-processing unit 34 may be provided in the signal-transmitting unit 101. Further, the signal-processing unit 34 may be the control unit (not shown) that controls the grinding machine.

The receiving antenna 31 is almost identical to the transmitting antenna 25. The receiving/demodulating unit 32 receives and demodulates a radio signal from the receiving antenna 31, which has caught the radio signal transmitted from the signal-transmitting unit 101. The power-supply unit 33 supplies power to the receiving/demodulating unit 32. It supplies power by radio to the signal-transmitting unit 101, too, while the signal-receiving unit 102 is receiving no radio signals form the signal-transmitting unit 101. The power-supply unit 33 may supply power to the signal-processing unit 34, too, whenever necessary.

Note that the receiving/demodulating unit 32 and the power-supply unit 33 should better be provided in the form of an IC chip, like as in the signal-transmitting unit 101.

The operation of the configuration described above will be explained with reference to FIGS. 1 and 2. When the grindstone 6 contacts the workpiece 5, grinding the workpiece 5, ultrasonic waves are generated. The ultrasonic waves propagate through the workpiece 5 and the rotating-side chuck 4 and are detected by the AE sensor 21. The level of the ultrasonic waves varies in accordance with the depth to which the workpiece 5 is ground by the grindstone 6. Hence, the ultrasonic waves detected can be utilized to control the position of the grindstone 6.

The AE sensor 21 generates a signal representing the level of ultrasonic waves. The analog-to-digital converter 22 converts the signal to a digital signal. The digital signal is supplied via the modulating/transmitting unit 23 to the transmitting antenna 25. The antenna 25 transmits the digital signal by radio.

The receiving antenna 31 receives the radio signal transmitted from the transmitting antenna 25. The signal received is input to the receiving/demodulating unit 32. The unit 32 amplifies and demodulates the signal, generating a digital signal that represents the ultrasonic waves the AE sensor 21 has detected. The digital signal produced in the receiving/demodulating unit 32 is input to the signal-processing unit 34. The unit 34 processes the digital signal, generating a signal that is necessary to operate, control and so forth the grinding machine.

In the configuration described above, the detection signal generated when the grindstone 6 contacts the workpiece 5 is transmitted by radio to the receiving side. Therefore, the detection signal can be transmitted and received without using so much time or labor as in the conventional apparatus wherein the electromagnetic induction between two coils is utilized to transmit a detection signal and should therefore be precisely adjusted in position to be on the same axis.

In the above-described configuration, the AE sensor 21, analog-to-digital converter 22, modulating/transmitting unit 23 and transmitting antenna 25 constitute a detecting/radio-transmitting means, the radio power-supply unit 24 and power-supply unit 33 constitute a radio power-supply means, and the receiving antenna 31 and receiving/demodulating unit 32 constitute a receiving means. These means constitute a detection-signal transmitting apparatus for machine tools.

Figure 3:
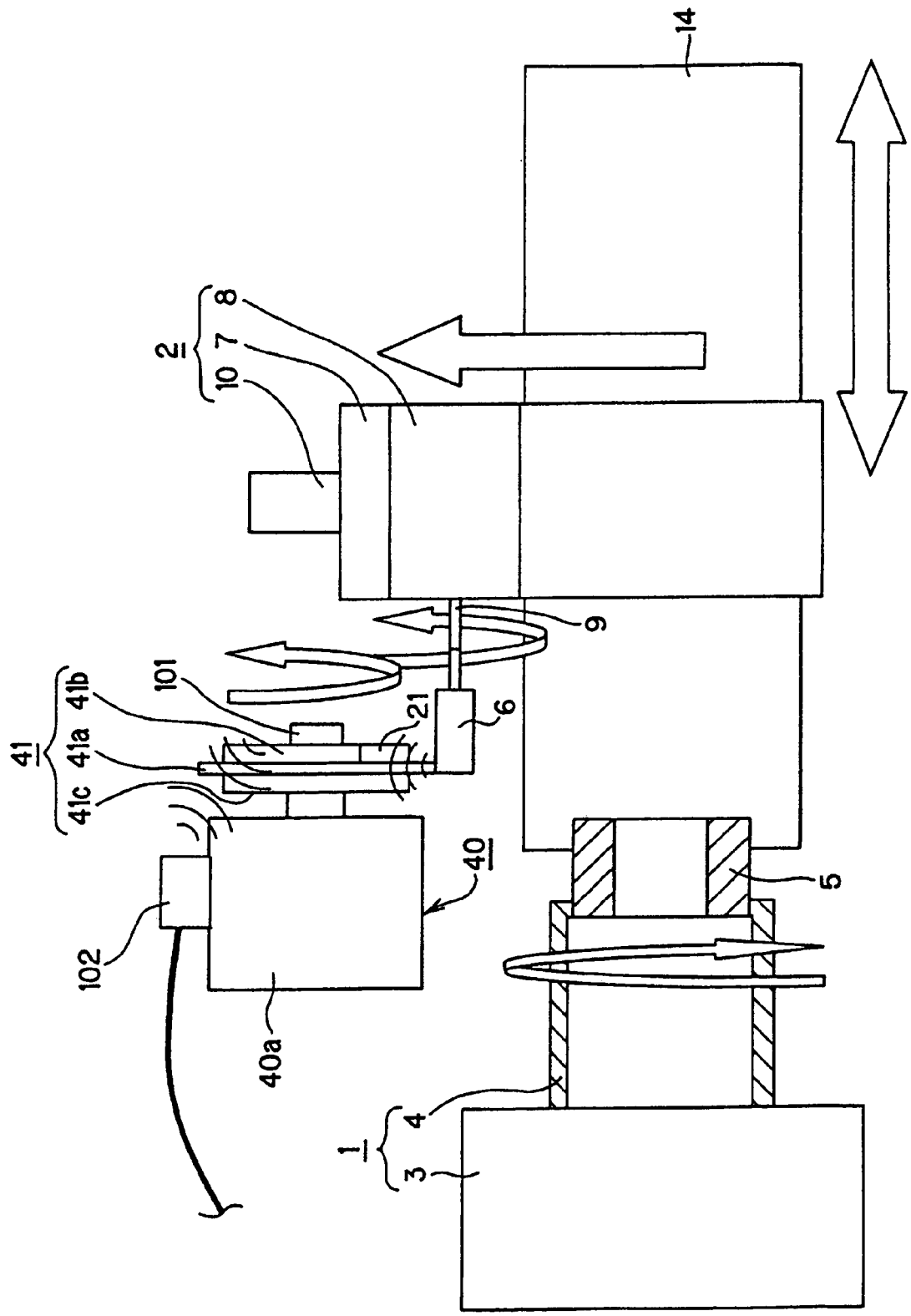
FIG. 3 is a diagram showing the second configuration of the detection-signal transmitting apparatus according to the embodiment of this invention.

Next, a second configuration will be described, with reference to FIG. 3. The components identical to those shown in FIG. 1 are designated at the same reference numbers and will not be described in detail. Only the different features will be described below.

The second configuration provides a detection-signal transmitting apparatus for a grinding machine that has a dressing apparatus. It is suitable for detecting a contact between the grindstone 6 and the dresser 41, both used in the machine.

The grinding machine related to this configuration is identical in structure to the machine shown in FIG. 1, except that it has a dressing apparatus that will be described below.

The dressing apparatus has, as major components, a dresser motor 40 and a dresser 41. The dresser 41 shaped like a disc can be rotated by the dresser motor 40. Its basic structure is well known to the public. The dresser 41 comprises a main body 41a shaped like a disc and holding members 41b and 41d, both shaped like a disc and holding the main body 41a between them. One holding member 41b, for example, is secured to the dresser motor 40 and located remote from the dresser motor 40. The other holding member 41c is secured to the dresser motor 40 and located near the dresser motor 40. An AE sensor 21 is attached to an appropriate part of the circumferential surface of the holding member 41b. A signal-transmitting unit 101 is mounted on the center part of the holding member 41b. A signal-receiving unit 102 is mounted on the case 40a of the dresser motor 40, at an appropriate position on the case 40a.

The signal-transmitting unit 101 and the signal-receiving unit 102 are identical in configuration to those shown in FIG. 2. Therefore, they will not be described in detail.

The operation of this configuration will be explained, with reference to FIG. 2 and FIG. 3. When the dresser 41 contacts the grindstone 6, starting dressing, ultrasonic waves are generated. The ultrasonic waves propagate through the dresser 41. The AE sensor 21 detects the waves. The level of the waves varies with the amount of dressing the dresser 41 performs on the grindstone 6. Hence, the ultrasonic waves detected can be used to control the position of the dresser 41.

The signal detected by the AE sensor 21 is supplied to the analog-to-digital converter 22. The converter 22 converts the signal to a digital signal. The modulating/transmitting unit 23 sends the digital signal to the transmitting antenna 25, which transmits the signal by radio.

The radio signal transmitted from the transmitting antenna 25 is input via the receiving antenna 31 to the receiving/demodulating unit 32. The receiving/demodulating unit 32 amplifies and demodulates the signal, generating a digital signal that represents the ultrasonic waves the AE sensor 21 has detected. The digital signal generated by the unit 32 and representing the ultrasonic waves is input to the signal-processing unit 34. The unit 34 processes the digital signal, generating a signal that is necessary to operate, control and so forth the grinding machine.

Thus, the detection signal of the ultrasonic waves generated as the dresser 41 contacts the grindstone 6 is transmitted by radio to the receiving side. Therefore, the detection signal can be transmitted and received without using so much time or labor as in the conventional apparatus wherein the electromagnetic induction between two coils is utilized to transmit a detection signal and should therefore be precisely adjusted in position to be on the same axis.

In this configuration described above, the AE sensor 21, analog-to-digital converter 22, modulating/transmitting unit 23 and transmitting antenna 25 constitute a detecting/radio-transmitting means, the radio power-supply unit 24 and power-supply unit 33 constitute a radio power-supply means, and the receiving antenna 31 and receiving/demodulating unit 32 constitute a receiving means. These means constitute a detection-signal transmitting apparatus for machine tools.

As indicated above, the AE sensor 21, the analog-to-digital converter 22, modulating/transmitting unit 23 and transmitting antenna 25 constitute a detecting/radio-transmitting means, the radio power-supply unit 24 and power-supply unit 33 constitute a radio power-supply means, and the receiving antenna 31 and receiving/demodulating unit 32 constitute a receiving means. Therefore, an AE-signal transmitting apparatus for use on dressing apparatus is provided.

Further, the radio power-supply unit 24 and the power-supply unit 33 constitute a radio-power supplying device in the dressing apparatus of this configuration.

Figure 4:
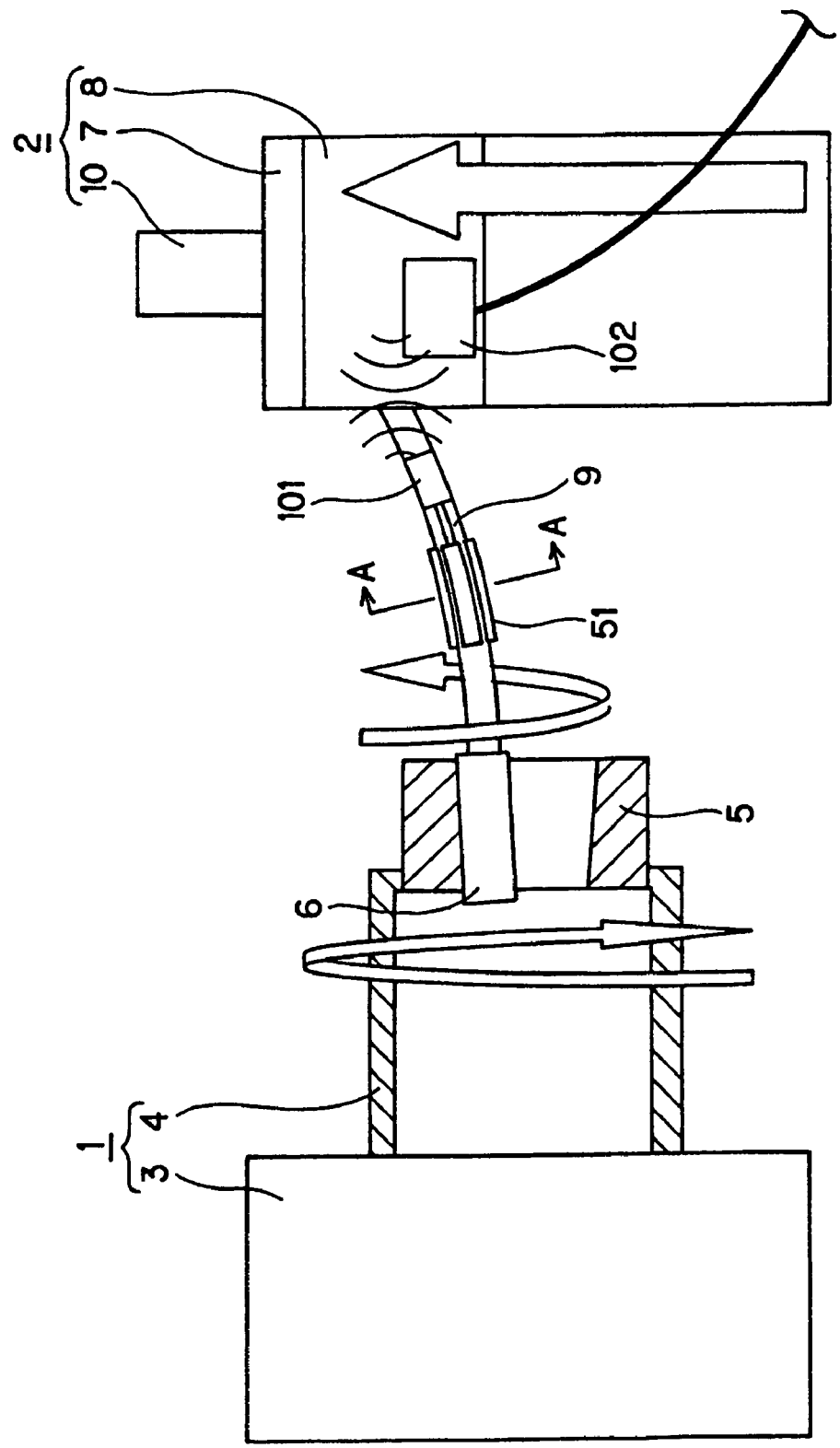
FIG. 4 is a diagram showing the third configuration of the detection-signal transmitting apparatus according to the embodiment of this invention.
Figure 5:
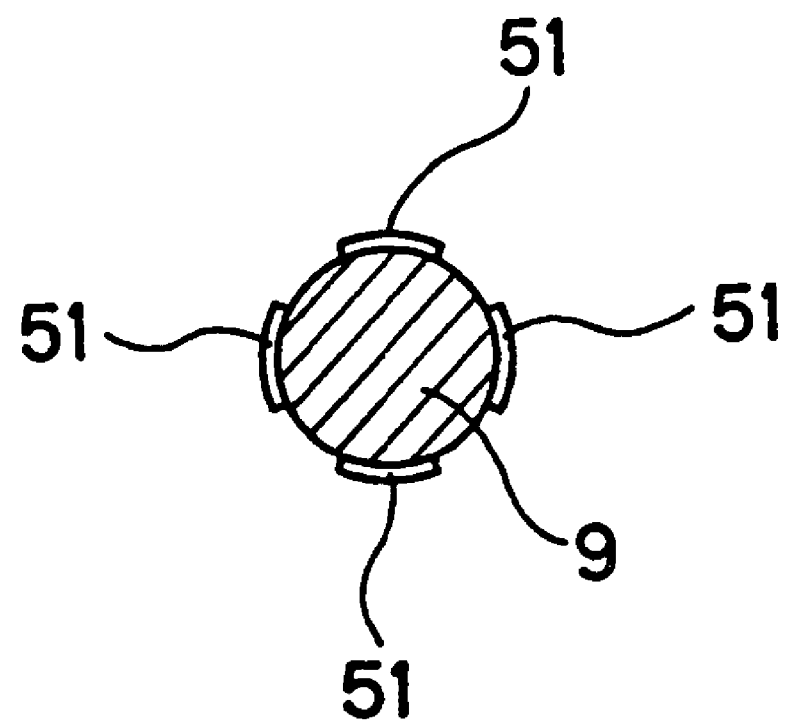
FIG. 5 is a sectional view of the configuration shown in FIG. 4, taken along line A-A.

A third configuration will be described, with reference to FIG. 4 and FIG. 5. The components identical to those shown in FIG. 1 are designated at the same reference numbers and will not be described in detail. Only the different features will be described below.

The third configuration provides a detection-signal transmitting apparatus that is suitable for transmitting, particularly a detection signal representing the flexure of the grindstone shaft 9 of a grinding machine. The grinding machine related to this configuration is basically identical in structure to the machine shown in FIG. 1. In this grinding machine, a flexure-detecting element 51 that detects the flexure of the grindstone shaft 9 is attached at an appropriate position on the grindstone shaft 9 (see FIG. 4 and FIG. 5). Here, the flexure-detecting element 51 is preferably a piezoelectric element and strain gauge, for example.

A signal-transmitting unit 101 is provided at an appropriate position near the flexure-detecting element 51 that is mounted on the periphery of the grindstone shaft 9. On the grindstone spindle unit 8, a signal-receiving unit 102 is mounted at an appropriate position. The position of the signal-receiving unit 102 is not limited to this. The unit 102 may be provided at, for example, an appropriate position on the sliding table 7. The signal-transmitting unit 101 and the signal-receiving unit 102 are identical to those shown in FIG. 2. Therefore, they will not be described in detail.

The operation of this configuration will be explained, with reference to FIG. 2 and FIG. 4. After the grinding is started, the grindstone shat 9 is flexed in accordance with the condition in which the grindstone 6 grinds the workpiece 5. The flexure-detecting element 51 detects this flexure, generating an analog signal that corresponds to the flexure detected. The signal is input from the element 51 to the analog-to-digital converter 22. The converter 22 converts the signal to a digital signal. The modulating/transmitting unit 23 sends the digital signal to the transmitting antenna 25, which transmits the signal by radio.

The radio signal transmitted from the transmitting antenna 25 is input via the receiving antenna 31 to the receiving/demodulating unit 32. The unit 32 amplifies and demodulates the signal, generating a digital signal that represents the flexure of the grindstone shat 9. The digital signal generated by the unit 32 and representing the flexure is input to the signal-processing unit 34. The unit 34 processes the digital signal, generating a signal that can control the grinding machine.

In the configuration described above, the flexure-detecting element 51, analog-to-digital converter 22, modulating/transmitting unit 23 and transmitting antenna 25 constitute a detecting/radio-transmitting means, the radio power-supply unit 24 and power-supply unit 33 constitute a radio power-supply means, and the receiving antenna 31 and receiving/demodulating unit 32 constitute a receiving means. Therefore, a detection-signal transmitting apparatus for use on machine tools is provided.

A fourth configuration will be described, with reference to FIG. 6. The components identical to those shown in FIG. 1 are designated at the same reference numbers and will not be described in detail. Only the different features will be described below.

The fourth configuration provides a detection-signal transmitting apparatus that is suitable for transmitting, particularly a detection signal representing the temperature of the grindstone shaft 9 of a grinding machine. The grinding machine related to this configuration is basically identical in structure to the machine shown in FIG. 1.

In this grinding machine, the bearing 11 of the grindstone spindle body 8 generates heat as the grindstone shaft 9 rotates. The heat raises the temperature of the grindstone shaft 9, which undergoes thermal expansion. Thus, the grindstone 6 may be displaced in its thrust direction. In processes of forming a space 12 in the workpiece 5 and forming a conical seat 13, in particular, the displacement of the grindstone 6, in the thrust direction thereof, greatly influences the finished precision of the space and the seat. Therefore, the temperature of the grindstone shaft 9 must be detected in some cases, as one parameter for controlling the position of the grindstone 6.

Figure 6:
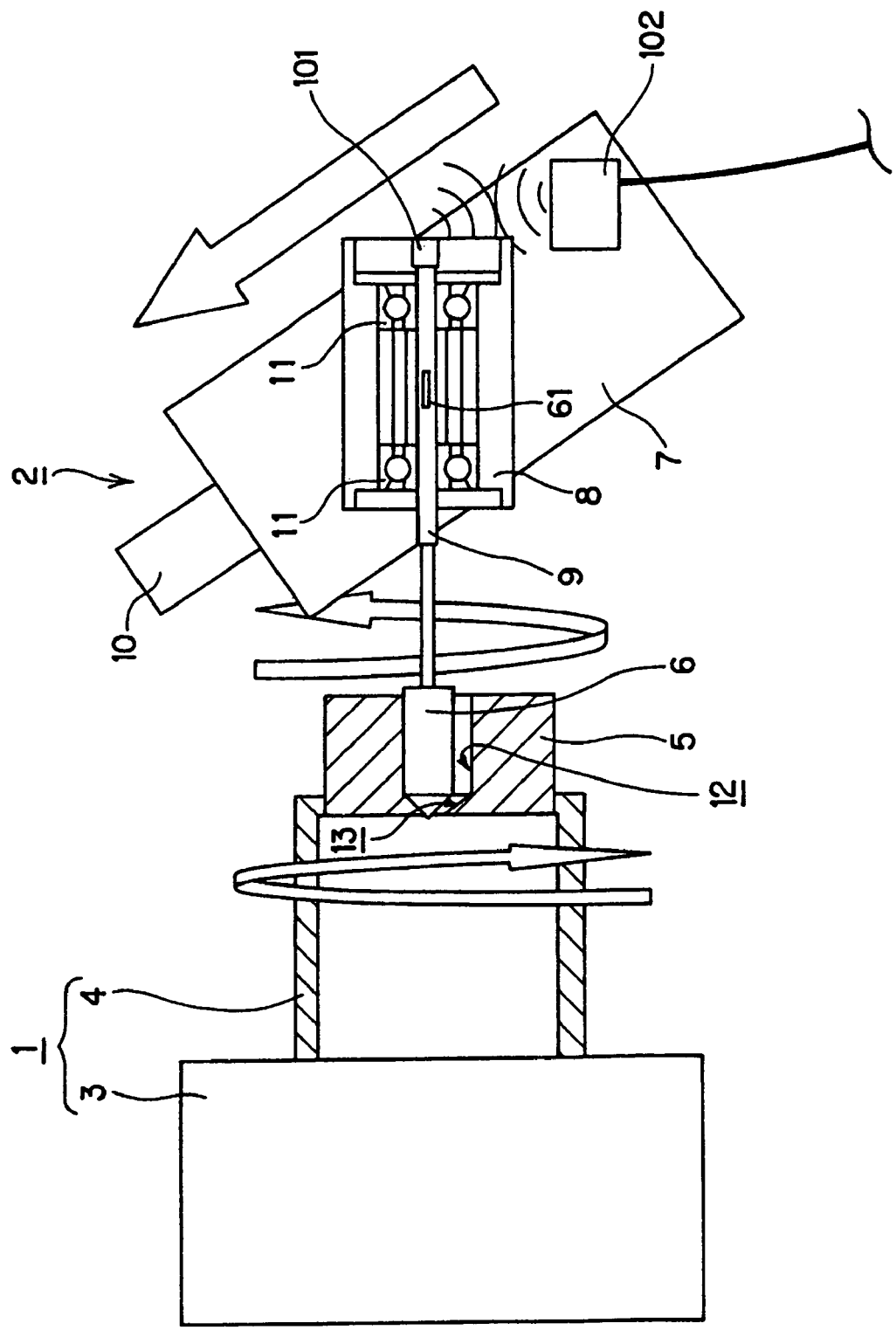
FIG. 6 is a diagram showing the fourth configuration of the detection-signal transmitting apparatus according to the embodiment of this invention.

The configuration shown in FIG. 6 is fit for detecting the temperature of the grindstone shaft 9 in such a case. A temperature sensor 61 is adhered to the grindstone shaft 9, more particularly at an appropriate position on the outer circumferential surface of the grindstone shaft 9 that lies in the grindstone spindle body 8. A signal-transmitting unit 101 is provided in that end of the grindstone spindle body 8, which is remote from the grindstone 6.

A signal-receiving unit 102 is mounted on the sliding table 7, at an appropriate position on the table 7. The signal-transmitting unit 101 and the signal-receiving unit 102 are identical to those shown in FIG. 2. Therefore, they will not be described in detail The operation of this configuration will be explained, with reference to FIG. 2 and FIG. 6. Grinding is started, and the grindstone 6 grinds the workpiece 5. As the bearing 11 rotates, heat is generated, raising the temperature of the grindstone shaft 9. The temperature sensor 61 adhered to the grindstone shaft 9 detects this change in temperature of the grindstone shaft 9 and generates a detection signal. The signal-transmitting unit 101 transmits, by radio, the detection signal in the form of a digital signal, in the same way as in the configurations described above.

The digital signal is received and demodulated in the signal-receiving unit 102. The digital signal is input to the signal-processing unit 34. The unit 34 processes the digital signal, generating a signal that is necessary to operate, control and so forth the grinding machine.

In the configuration described above, the temperature sensor 61, analog-to-digital converter 22, modulating/transmitting unit 23 and transmitting antenna 25 constitute a detecting/radio-transmitting means, the radio power-supply unit 24 and power-supply unit 33 constitute a radio power-supply means, and the receiving antenna 31 and receiving/demodulating unit 32 constitute a receiving means. Therefore, a detection-signal transmitting apparatus for use on machine tools is provided.

In any configuration described above, the analog-to-digital converter 22, modulating/transmitting unit 23, transmitting antenna 25, receiving antenna 31 and receiving/demodulating unit 32 constitute a transmitting/receiving means. The AE sensor 21, the flexure-detecting element 51, or the temperature sensor 61 is used as detecting means. Thus, a detection-signal transmitting apparatus is provided.

The analog-to-digital converter 22, modulating/transmitting unit 23, transmitting antenna 25, receiving antenna 31 and receiving/demodulating unit 32 constitute a transmitting/receiving means. The radio power-supply unit 24 and power-supply unit 33 constitute a radio power-supply means. Thus, a detection-signal transmitting apparatus is provided.

The configurations described above are grinding machines. Nonetheless, the present invention is not limited to these machines. The invention can be applied to, for example, cutting machines in a similar manner.

Unlike the conventional techniques, this invention does not require troublesome adjustment for installation and can easily transmit a detection signal representing changes of an object observed, to any desirable site without performing complex adjustment on the signal.

In addition, unlike the conventional techniques, this invention can provide an apparatus that is as small as is demanded and can yet transmit a reliable detection signal to any site desired.

What is claimed is:

1. A detection-signal transmitting apparatus for use on a machine that transmits ultrasonic waves generated at the time of grinding a workpiece or dressing a grindstone, the detection-signal transmitting apparatus for use on a machine, comprising:

a signal-transmitting unit; and a signal-receiving unit, said signal-transmitting unit being provided together with an ultrasonic-wave sensor and attached to a rotating member that rotates together with the workpiece or a dresser used for the dressing, said signal-transmitting unit includes an analog-to-digital converter that digital-converts an output signal of the ultrasonic-wave sensor, a modulating/transmitting unit that modulates the output signal of said analog-to-digital converter and transmits the output signal by radio, a transmitting antenna that is connected to said modulating/transmitting unit, and a radio power-supply that receives radio waves transmitted from outside via said transmitting antenna, generates a necessary power-supply voltage by converting the radio waves to power, and supplies power to a digital converter and a radio transmitting unit, and said signal-receiving unit includes a receiving antenna, a receiving/demodulating unit that receives a transmitted signal of said modulating/transmitting unit via said receiving antenna, and demodulates the transmitted signal, a signal-processing unit that converts and processes a detection signal of the ultrasonic-wave sensor demodulated by said receiving/demodulating unit to a predetermined signal necessary for controlling operation of the machine, and a power-supply unit that supplies power for said signal-receiving unit, said power-supply unit supplying power by a radio signal to said signal-transmitting unit while said receiving/demodulating unit is not in a state of receiving a radio signal from said signal-transmitting unit.

2. A detection-signal transmitting apparatus for use on a machine that transmits ultrasonic waves generated at the time of grinding a workpiece or dressing a grindstone, the detection-signal transmitting apparatus for use on a machine, comprising:

a signal-transmitting unit; and a signal-receiving unit, said signal-transmitting unit being provided together with an ultrasonic-wave sensor and attached to a rotating member that rotates together with the workpiece said signal-transmitting unit includes an analog-to-digital converter that digital-converts an output signal of the ultrasonic-wave sensor, a modulating/transmitting unit that modulates the output signal of said analog-to-digital converter and transmits the output signal by radio, a transmitting antenna that is connected to said modulating/transmitting unit, and a radio power-supply that receives radio waves transmitted from outside via said transmitting antenna, generates a necessary power-supply voltage by converting the radio waves to power, and supplies power to a digital converter and a radio transmitting unit, and said signal-receiving unit includes a receiving antenna, a receiving/demodulating unit that receives a transmitted signal of said modulating/transmitting unit via said receiving antenna, and demodulates the transmitted signal, a signal-processing unit that converts and processes a detection signal of the ultrasonic-wave sensor demodulated by said receiving/demodulating unit to a predetermined signal necessary for controlling operation of the machine, and a power-supply unit that supplies power for said signal-receiving unit, said power-supply unit supplying power by a radio signal to said signal-transmitting unit while said receiving/demodulating unit is not in a state of receiving a radio signal from said signal-transmitting unit, and the rotating member that rotates together with a workpiece is a rotating-side chuck that has the workpiece removably attached thereto and is provided in a rotatable manner by a motor, and the rotating-side chuck has the ultrasonic-wave sensor provided therein, while having the signal-transmitting unit is attached on the inside of the rotating-side chuck.

3. A detection-signal transmitting apparatus for use on a machine that transmits ultrasonic waves generated at the time of grinding a workpiece or dressing a grindstone, the detection-signal transmitting apparatus for use on a machine, comprising:

a signal-transmitting unit; and a signal-receiving unit, said signal-transmitting unit includes an analog-to-digital converter that digital-converts an output signal, a modulating/transmitting unit that modulates the output signal of said analog-to-digital converter and transmits the output signal by radio, a transmitting antenna that is connected to said modulating/transmitting unit, and a radio power-supply that receives radio waves transmitted from outside via said transmitting antenna, generates a necessary power-supply voltage by converting the radio waves to power, and supplies power to a digital converter and a radio transmitting unit, and said signal-receiving unit includes a receiving antenna, a receiving/demodulating unit that receives a transmitted signal of said modulating/transmitting unit via said receiving antenna, and demodulates the transmitted signal, a signal-processing unit that converts and processes a detection signal demodulated by said receiving/demodulating unit to a predetermined signal necessary for controlling operation of the machine, and a power-supply unit that supplies power for said signal-receiving unit, said power-supply unit supplying power by a radio signal to said signal-transmitting unit while said receiving/demodulating unit is not in a state of receiving a radio signal from said signal-transmitting unit, and a grindstone is provided in a movable manner with respect to a workpiece by a grindstone-holding unit, the grindstone-holding unit has a grindstone spindle unit to which the grindstone is attached in a rotatable manner, and the grindstone spindle unit is configured with a grindstone shaft having the grindstone attached to one end thereof in a removable manner, while having the other end thereof being inserted in the grindstone spindle unit, a flexure-detecting element is adhered on the outer circumferential surface of the grindstone shaft, and also the signal-transmitting unit is provided on the grindstone shaft, and an output signal of the flexure-detecting element is transmitted by radio to said signal-receiving unit by the signal-transmitting unit, received and demodulated at said signal-receiving unit, and used for controlling a position of the grindstone.

4. A detection-signal transmitting apparatus for use on a machine that transmits ultrasonic waves generated at the time of grinding a workpiece or dressing a grindstone, the detection-signal transmitting apparatus for use on a machine, comprising:

a signal-transmitting unit; and a signal-receiving unit, said signal-transmitting unit includes an analog-to-digital converter that digital-converts an output signal, a modulating/transmitting unit that modulates the output signal of said analog-to-digital converter and transmits the output signal by radio, a transmitting antenna that is connected to said modulating/transmitting unit, and a radio power-supply that receives radio waves transmitted from outside via said transmitting antenna, generates a necessary power-supply voltage by converting the radio waves to power, and supplies power to a digital converter and a radio transmitting unit, and said signal-receiving unit includes a receiving antenna, a receiving/demodulating unit that receives a transmitted signal of said modulating/transmitting unit via said receiving antenna, and demodulates the transmitted signal, a signal-processing unit that converts and processes a detection signal demodulated by said receiving/demodulating unit to a predetermined signal necessary for controlling operation of the machine, and a power-supply unit that supplies power for said signal-receiving unit, said power-supply unit supplying power by a radio signal to said signal-transmitting unit while said receiving/demodulating unit is not in a state of receiving a radio signal from said signal-transmitting unit, and a grindstone shaft has a temperature sensor adhered to an outer circumferential surface positioned in the inside of a grindstone spindle unit, while said signal-transmitting unit is provided in the grindstone spindle unit, and said signal-transmitting unit enables an output signal of the temperature sensor to be transmitted by radio to said signal-receiving unit, received and demodulated at said signal-receiving unit, and used for controlling the position of the grindstone.

\* \* \* \* \*